US006218040B1

(12) United States Patent
Romero

(10) Patent No.: US 6,218,040 B1
(45) Date of Patent: Apr. 17, 2001

(54) AUTOMATIC CIRCUIT BREAKER FOR A BATTERY

(75) Inventor: Antonio L. Romero, Parkton, MD (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/330,008

(22) Filed: Jun. 11, 1999

(51) Int. Cl.[7] .................................................... H01M 2/00

(52) U.S. Cl. ................................ 429/61; 429/57; 429/178

(58) Field of Search ................................... 429/61, 57, 7, 429/178

(56) References Cited

U.S. PATENT DOCUMENTS

| 4,188,460 | 2/1980 | Kang et al. | 429/7 |
| 4,690,879 | 9/1987 | Huhndorff et al. | 429/61 |
| 5,057,382 | 10/1991 | Tucholski | 429/61 |

*Primary Examiner*—John S. Maples
(74) *Attorney, Agent, or Firm*—Sughrue, Mion, Zinn, Macpeak & Seas, PLLC

(57) ABSTRACT

A circuit breaker which automatically interrupts the flow of current from a battery upon the development of a predetermined overcurrent. A weld connection around a periphery of an aperture determines a current path which has the lowest current carrying capacity in the battery. Therefore, the diameter of the aperture determines the amount of current which will break the weld thereby disconnecting the battery from a circuit.

27 Claims, 6 Drawing Sheets

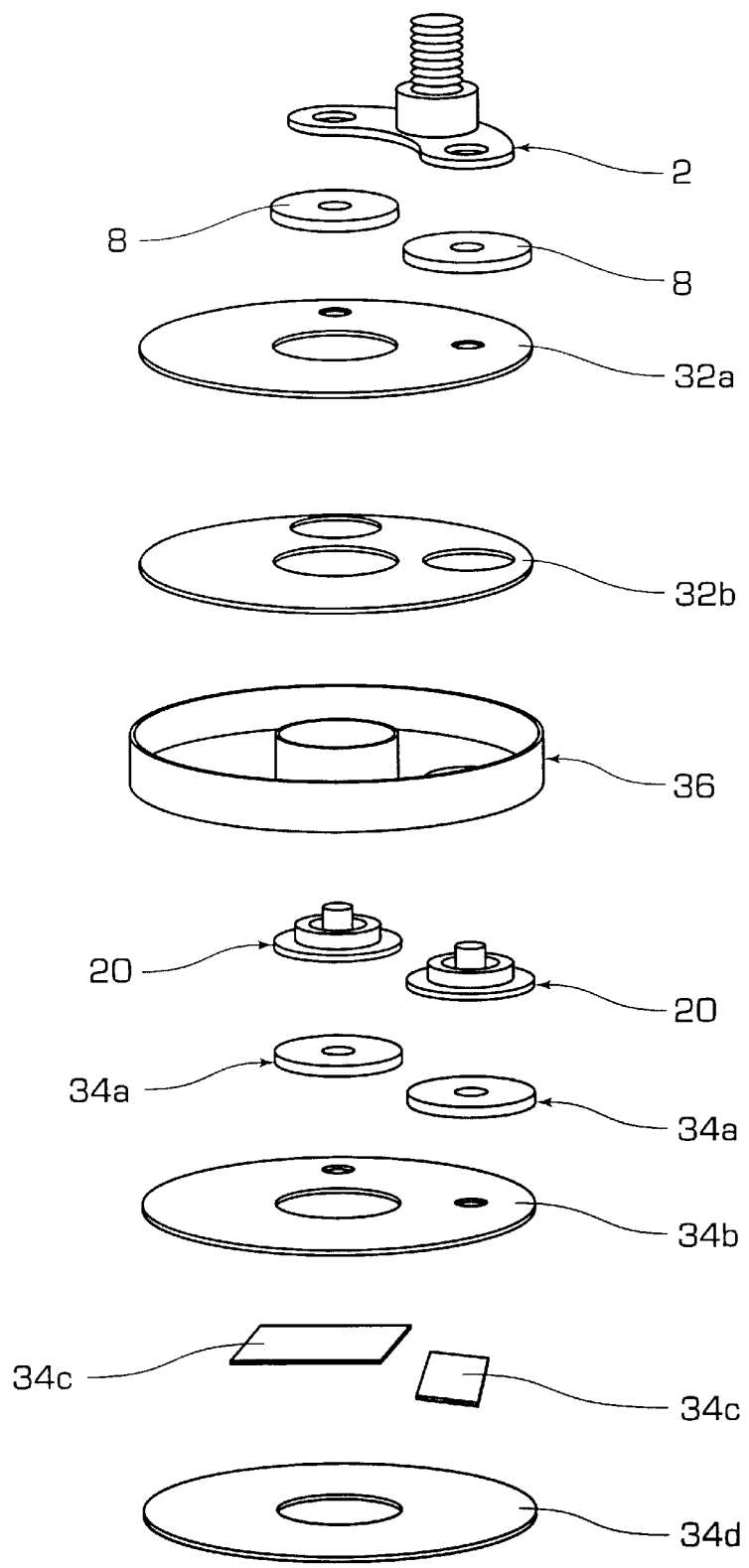

AUTOMATIC CIRCUIT BREAKER FOR A BATTERY

BACKGROUND OF THE INVENTION

1. Field of the Invention

The present invention is directed to controlling the flow of current from a battery and, more particularly, to controlling the flow of current from a rechargeable battery by way of an automatic circuit breaker which interrupts the flow of current from the battery upon the development of a predetermined overcurrent, with a device resistance of less than or equal to 0.2 milliohms.

2. Related Art

Batteries in the related art include circuit breakers for stopping the flow of current from the battery upon a predetermined condition. In particular, U.S. Pat. No. 4,188,460 to Kang et al. discloses an internal battery fuse in which excessive built-up heat resulting from a short circuit is concentrated in a portion which then heat fuses and interrupts the circuit. The heat fusible portion is formed as a thinned strip making up a portion of the current collector and is surrounded by a heat shield. When current exceeds a predetermined threshold, the thinned strip provides a greater electrical resistance than the rest of the current collector, and thus heats up. Because the shield retains the heat around the thinned strip, the thinned strip fuses to break the electrical connection within the current collector thus terminating current flow from the battery. Alternatively, the thinned strip may be a separate element which is welded between two portions of the current collector. However, Kang includes the disadvantage that the circuit is broken at a point within the cell itself. That is, the heat fusible portion is located adjacent the electrode stack which produces gasses that may be ignited by any arcing in the fusible portion. Further, because Kang requires a heat shield as well as either a thinned portion of an elongate strip current collector or a thinned strip welded to different portions of the current collector, his battery fuse is complex.

U.S. Pat. No. 4,690,879 to Huhndorff et al. and U.S. Pat. No. 5,057,382 to Tucholski also disclose complex mechanisms for interrupting the flow of current from a battery. In each of these batteries, the current flow is terminated upon the bulging of the cell due to excessive pressure therein. When pressure builds up within either battery, the ends bulge. In Huhndorff, the current is terminated due to a break in a weld connection between a cover terminal and a metal container upon the battery's bulging. In Tuchoski, the current is interrupted by the relative sliding movement between a secondary conductive cover and a container contact member upon the battery's bulging.

SUMMARY OF THE INVENTION

An object of the present invention is to overcome the disadvantages of the prior art.

A further object of the present invention is to provide a simple to manufacture mechanism which automatically interrupts the flow of current from a battery upon the development of a predetermined overcurrent. In the present invention, because a weld connection around the periphery of an aperture determines the current path, the diameter of the aperture determines the amount of current that will break the weld thereby opening the circuit. Thus, merely selecting a different aperture diameter allows variation in the amount of current allowed through the connection before it automatically opens.

A further object of the present invention is to provide a mechanism which automatically interrupts the flow of current from a battery with reduced risk of igniting gasses produced in an electrode stack of an electrochemical cell. The present invention includes an epoxy covering the weld connection which is broken to interrupt the flow of current such that the epoxy contains any arcing that occurs during interruption of current. Further, the weld connection which is broken to interrupt the flow of current is located on the outside of the battery enclosure so that even if any arcing does occur, it occurs away from gasses produced in the electrode stack, thereby reducing the risk of ignition.

The present invention automatically interrupts the current flow in a battery upon a predetermined overcurrent. In the battery of the present invention, a bussing structure within the battery enclosure is connected to a terminal assembly on the outside of the battery enclosure by an electric feed through. The electric feed through is connected to the terminal assembly by a weld connection formed around the periphery of an aperture formed in the terminal assembly. When a predetermined overcurrent develops, the weld connection is broken. The weld connection is circular and, thus its length is determined by the diameter of the aperture in the terminal plate around which the weld connection is made. The amount of overcurrent which breaks the connection is controlled by controlling the length of the weld which defines the length of conductor between the current bussing structure within the battery enclosure and the terminal plate on the outside of the battery enclosure. Further, the amount of overcurrent is controlled by the thickness and resistivity of the material chosen for the terminal assembly. Thus, the amount of overcurrent which breaks the connection is easily controlled by selecting an appropriate diameter for an aperture in, as well as thickness and resistivity of, a portion of the terminal assembly. Further, because the weld connection which breaks to interrupt current flow is formed between a terminal assembly and an electric feed through, on the outside of the battery enclosure, there is reduced risk of igniting battery gasses upon interruption of current.

In a lithium-ion cell, for example, the terminal assembly is made of copper and nickel, whereas the electric feed through is made of molybdenum. However, any suitable material may be used for the terminal assembly and electric feed through, depending on the type of battery in which the automatic circuit breaker is employed. In one embodiment of a lithium-ion cell, the thickness and resistivity of the terminal assembly, as well as the aperture diameter are selected so that the device has a resistance of less than or equal to 0.2 milliohms. Further, although the connection between the terminal assembly and the electric feed through is described as a weld connection, any suitable connection along the periphery of the aperture in the terminal assembly may be used. Moreover, although the present invention is particularly useful on rechargeable batteries used in electric vehicles, it may be used with any type of battery.

BRIEF DESCRIPTION OF THE DRAWINGS

The above and other objects and advantages of the present invention will become more apparent by describing in detail preferred embodiments thereof with reference to the accompanying drawings, wherein:

FIG. 2A is an exploded view of that shown in FIG. 2;

FIG. 5a is a top view, whereas

FIG. 7a is a top view, whereas

DETAILED DESCRIPTION OF THE INVENTION

Although the automatic circuit breaker may be used in any size and type of battery, particularly rechargeable batteries for electric vehicles, and may be used on either the positive or negative side, it will be described as employed on the positive side of an electrode stack in a rechargeable lithium-ion battery.

Figure 1:
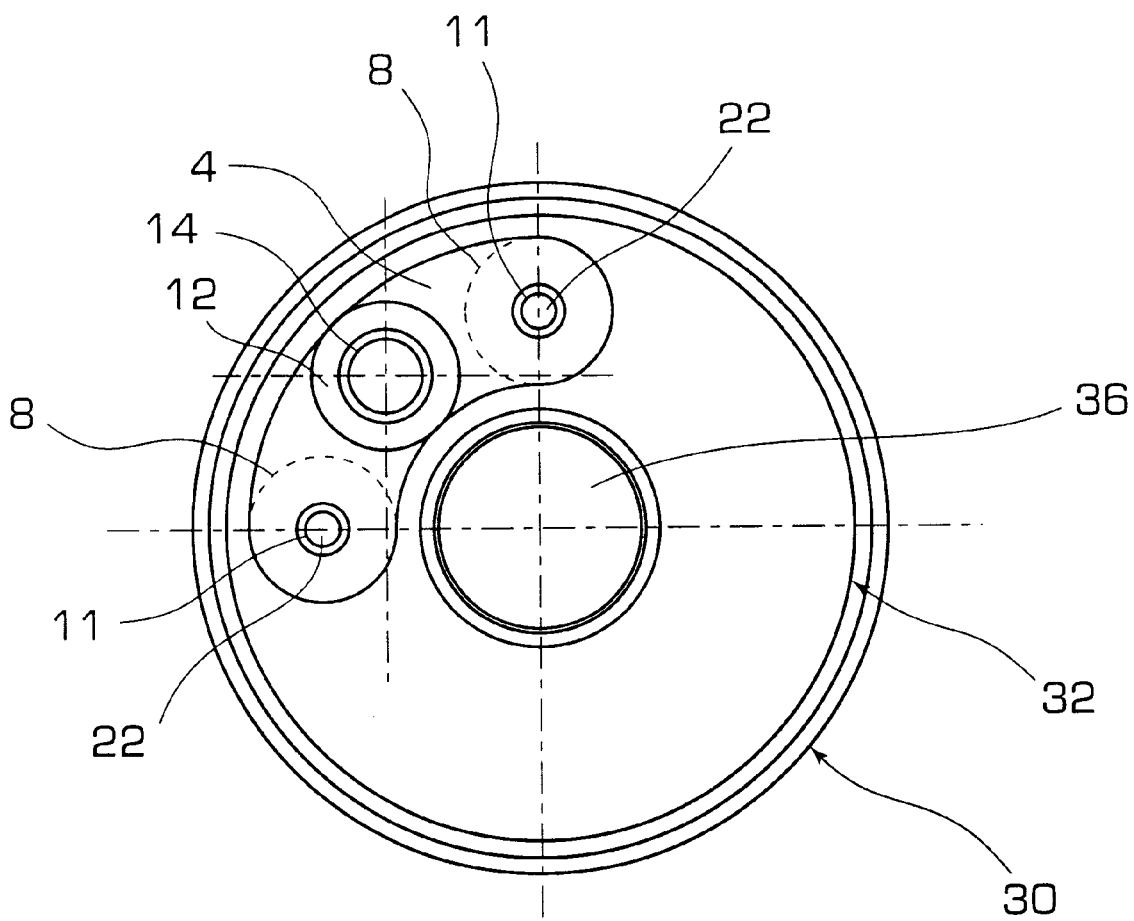
FIG. 1 is a top view of battery enclosure portion having a terminal assembly and electric feed through attached thereto according to the present invention.
Figure 2:
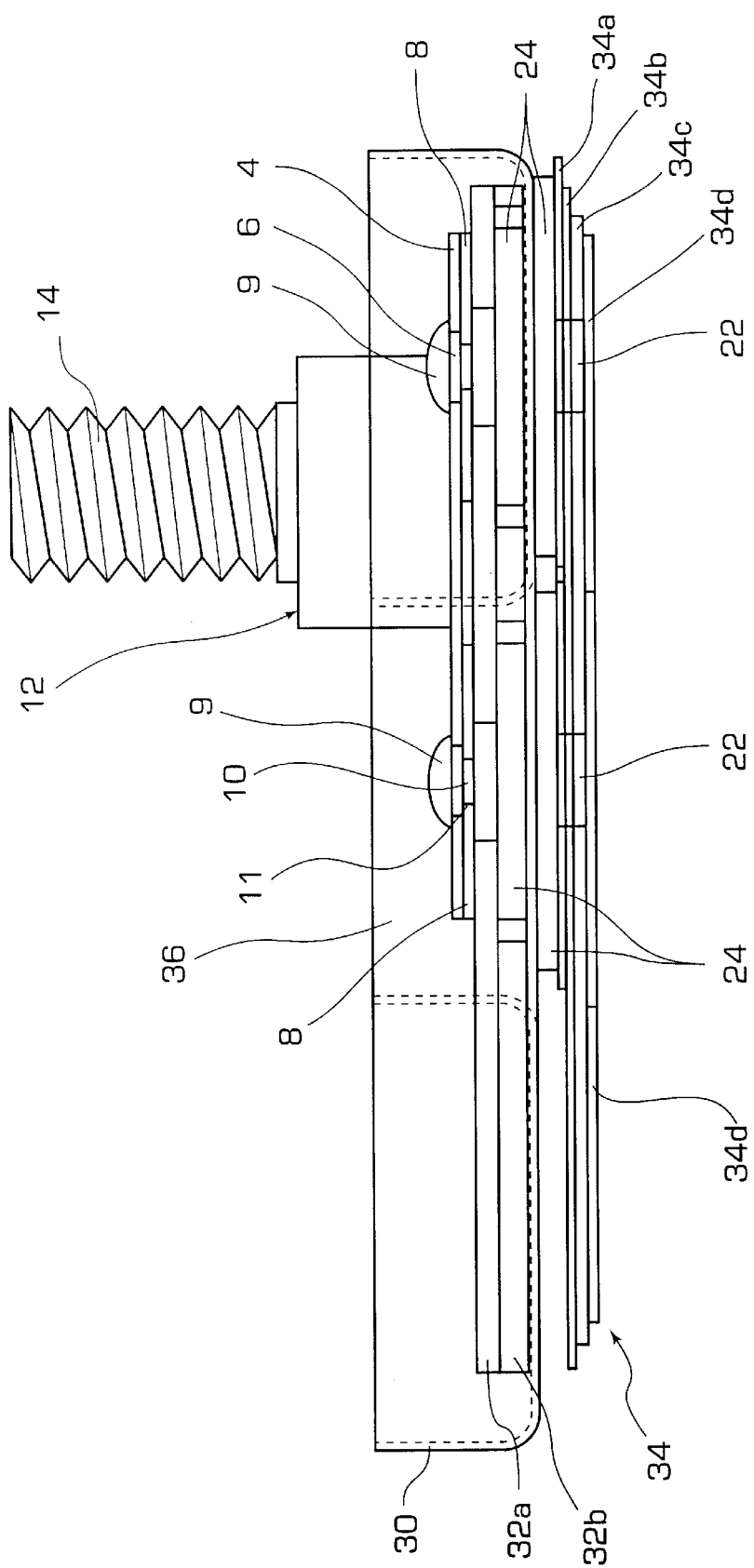
FIG. 2 is an enlarged side view of a battery enclosure portion having a terminal assembly, an electric feed through and a bussing structure attached thereto according to the present invention.

FIG. 1 shows a top view of a battery enclosure portion 30, whereas FIG. 2 shows a side view thereof. FIG. 2A is an exploded view of FIG. 2.

The battery enclosure portion 30 includes a central aperture 36 for connection to a hollow core which extends through the battery. The outer periphery of the battery enclosure portion 30 is then connected to the periphery of the battery case (not shown) which holds an electrode stack therein. When a hollow core is not used in the battery, the battery enclosure portion 30 does not need to include aperture 36. The details of the electrode stack and battery case have been omitted for clarity, and only the bussing structure 34 is shown. The bussing structure 34 may be connected to the electrode stack in any manner, but is preferably connected as described in copending application, filed on Jun. 11, 1999, the specification of which is hereby incorporated by reference. As best shown in FIG. 2A, the bussing structure 34 includes insulating disks 34a, an insulating washer 34b, and a positive bussing washer 34d. The current collection tabs 34c, extending from the electrode stack, are connected to the positive bussing washer 34d.

In the battery, current flows in a path from the electrode stack to bussing structure 34, then to electric feed through 20, through weld connection 11 and finally to terminal assembly 2. See FIGS. 1–4, 7a and 7b. Specifically, the circuit breaker is formed in the weld connection 11 between the terminal assembly 2 and electric feed through 20, because the weld connection 11 has the smallest current carrying capacity in the current path. An epoxy 9 (see FIG. 2) covers the weld connection 11 to contain any arcing that may occur when the weld connection 11 is broken to interrupt the flow of current.

Further, as shown in FIG. 2, the weld connection 11 is formed on the outside of the battery case portion 30, i.e., the side opposite to that on which the bussing structure 34 and hence electrode stack are located. Thus, because the circuit breaker is located away from the electrode stack, there is reduced risk of igniting battery gasses upon interruption of current. That is, because the weld connection 11 which is broken to interrupt the flow of current is located on the outside of the battery enclosure 30, even if any arcing did occur during the interruption of current, such arcing would occur away from gasses produced in the electrode stack, thereby reducing the risk of ignition. Details of the terminal assembly 2 and electric feed through 20, the parts between which the weld connection 11 is made to form the circuit breaker, will now be described.

Figure 3:
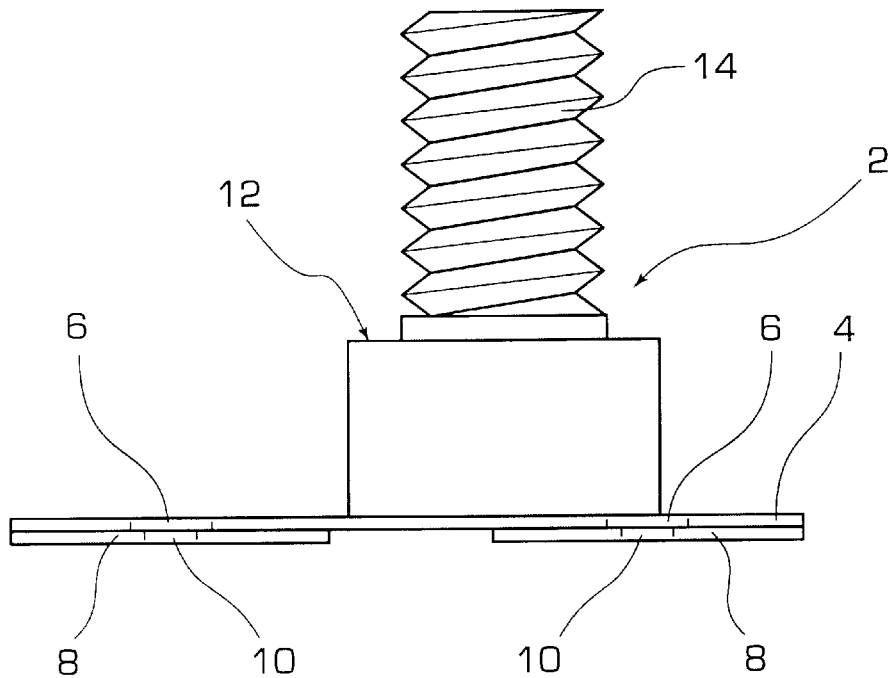
FIG. 3 is a side view of a terminal assembly according to the present invention.
Figure 4:
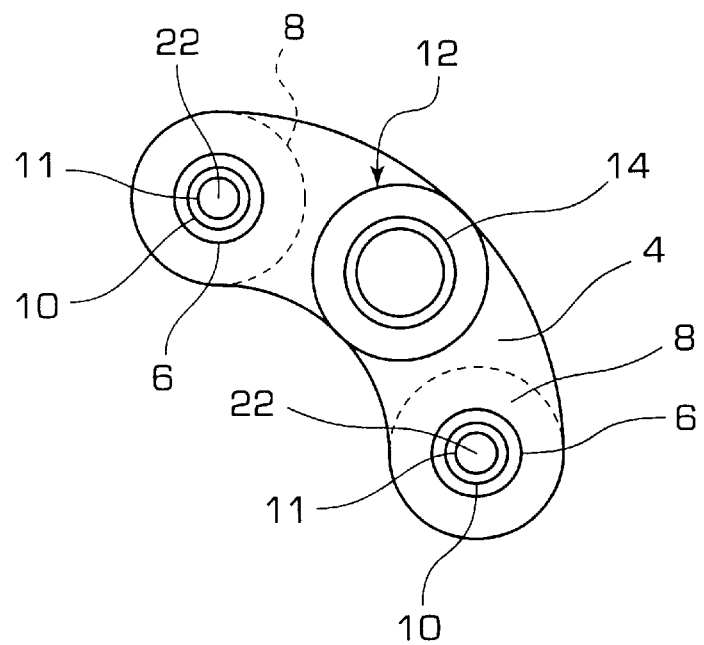
FIG. 4 is a top view of a terminal assembly having an electric feed through attached thereto according to the present invention.
Figure 5A:
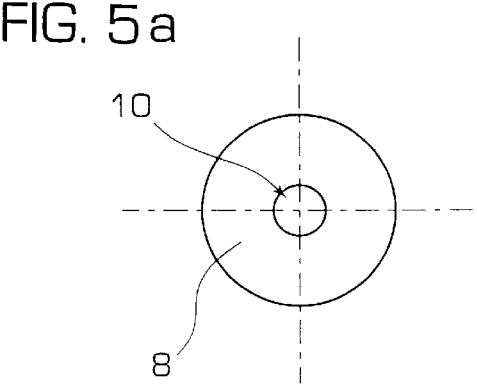
Figure 5B:
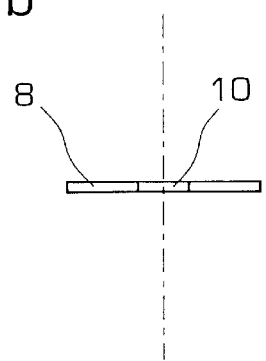
FIG. 5b is a side view, of a contact disk according to the present invention.
Figure 6:
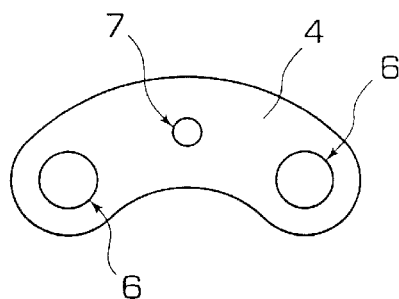
FIG. 6 is a top view of a current plate according to the present invention.

The terminal assembly 2 is shown in detail in FIG. 3, wherein portions thereof are shown in FIGS. 5a, 5b and 6. A top view of the terminal assembly 2 as it is connected to the electric feed through 20 is shown in FIG. 4.

The terminal assembly 2 is disposed adjacent the battery case portion 30, on a side thereof which is opposite that on which bussing structure 34 is disposed. An external insulator 32 separates the battery case portion 30 and the terminal assembly 2. The external insulator is made of a top external insulator 32a and a bottom external insulator 32b. Although shown as being made of two pieces, 34a, 34b, the external insulator 32 may be made as a single unit. The terminal assembly 2 includes a current plate 4. Current plate 4 includes a hole 7 for connection to stud 12. Although hole 7 is shown for connection to the stud, the stud and current plate 4 may be connected in any other suitable manner. The stud 12 includes a threaded portion 14 thereon for connection of the terminal assembly, and hence the battery, to a desired load during use. The current plate 4 further includes holes 6 to facilitate connection of the terminal assembly 2 to the electric feed through 20. Each hole 6 allows access to an aperture 10 of a contact disk 8 which is connected to the current plate 4 on a side opposite to that on which the stud 12 is connected. That is, each hole 6 has a larger diameter than that of the aperture 10 of a respective contact disk 8. The connection between the current plate 4 and contact disks 8 can be made by laser welding, for example, along a diameter larger than that of each hole 6. The laser weld connection thus forms an electrical connection between the current plate 4 and contact disk 8. In a lithium-ion battery, for example, the current plate 4 and stud 12 are preferably made of copper, whereas the contact disks 8 are preferably made of nickel.

Figure 7A:
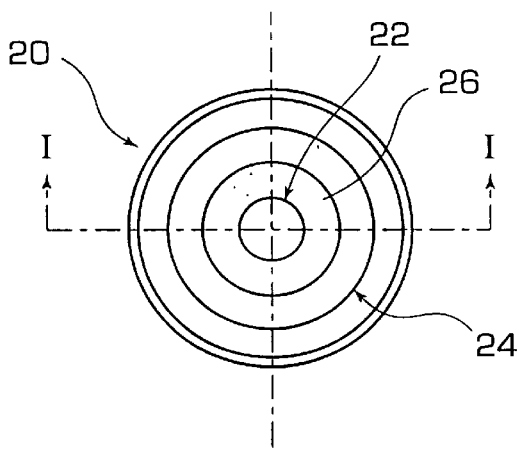
Figure 7B:
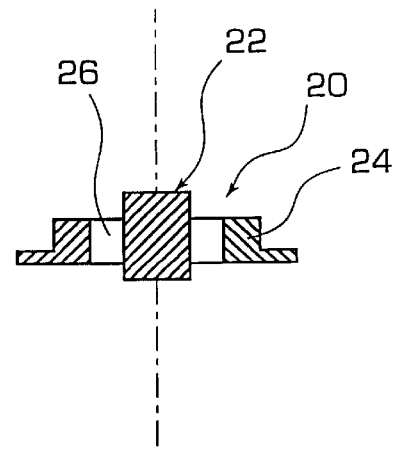
FIG. 7b is a cross sectional side view taken along line I—I in FIG. 7a, of an electric feed through according to the present invention.
Figure 8:
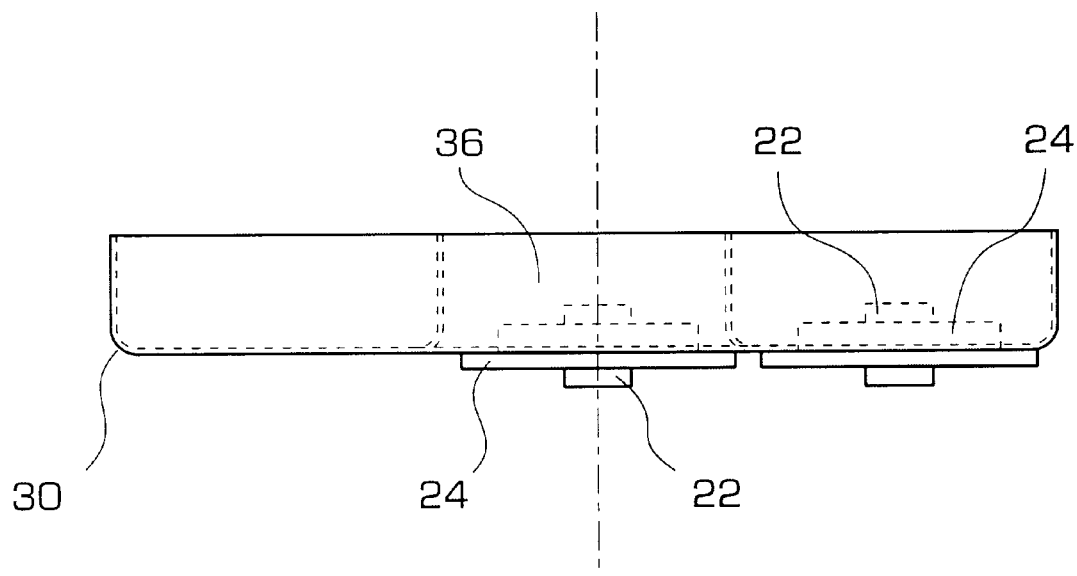
FIG. 8 is a side view of a battery enclosure portion having an electric feed through attached thereto, according to the present invention.

An electric feed through 20 is shown in detail in FIGS. 7a and 7b. The connection of the electric feed through 20 to the bussing structure 34 is shown in FIG. 2, whereas its connection to the terminal assembly 2 is shown in FIGS. 2 and 4. Further, in FIG. 8, the electric feed through 20 is shown connected to the battery enclosure portion 30 without the terminal assembly 2 and bussing structure 34, for clarity.

Each electric feed through 20 includes a conductive post 22 which is surrounded by an insulating spacer 24 with a space 26 therebetween. The insulating spacer 24 prevents electrical contact between the conductive post 22 and the battery enclosure portion 30. The bussing structure 34, and in particular the insulating disks 34a, may be supported against the spacer 24, whereas external insulator 32, and in particular top external insulator 32a, may be supported by the other side of spacer 24. The conductive post 22 of each electric feed through is connected on one end to the bussing structure 34 of the battery, as shown in FIG. 2. Particularly, the conductive posts 22 are electrically connected to positive bus washer 34d, and tabs 34c. An end surface of the post 22 is connected to the bussing structure to form an electrical connection therewith. Further, the other end of each post 22 is welded to a respective contact disk 8 of the terminal assembly 2 to connect the bussing structure 34 on the inside of the battery with the terminal assembly 2 on the outside of the battery. In a lithium-ion battery, for example, the post 22 is preferably made of molybdenum. However, the post 22 may be made of any other suitable material depending on the type of battery in which the circuit breaker is employed.

Each post 22 is connected to a respective contact disk 8 by a weld connection 11 made around the periphery of aperture 10. Because the hole 6 in the current plate 4 has a larger diameter than the aperture 10, the weld connection 11 can easily be made from the outside of the battery. An epoxy 9 fills aperture 10 and hole 6 to cover weld connection 11. Thus, when weld connection 11 is broken to interrupt current flow from the battery, epoxy 9 contains arcing. The post 22 has a larger diameter than that of the aperture 10, so the weld connection 11 is formed on an end surface of the post 22 and forms an electrical connection between the post 22 and contact disk 8.

Further, the relative diameters of the holes 6, posts 22, and apertures 10 are sized such that: the diameter of each weld connection between the current plate 4 and a contact disk 8 is larger than that of weld connection 11 between each contact disk 8 and a respective post 22; the diameter of each post is larger than that of each aperture 10, so that the electrical connection between each post 22 and the bussing structure 34 is larger than that of weld connection 11 between each post 22 and a respective contact disk 8. Thus, the weld connection 11 is the smallest diameter connection among the connections between the bussing structure 34, the electric feed through 20 and the terminal assembly 2. Therefore, because the weld connection 11 has the smallest diameter, it is the shortest length of conductor and hence has the least current carrying capacity; it will be the first to fail upon the development of overcurrent, and thus acts as a circuit breaker.

Additionally, because the weld connection is made in a portion of the contact disk 8 around the periphery of aperture 10, the length of the weld connection is controlled by the size of the aperture 10. Therefore, varying the size of the aperture 10 controls the amount of overcurrent which will cause the weld connection 11 to fail and interrupt current flow. That is, if the aperture 10 is made larger, the length of the weld connection 11 is longer thereby reducing impedance and, therefore, causing the circuit breaker to open at a larger overcurrent than when a smaller aperture 10 is used. Similarly, when the aperture 10 is made smaller, the length of the weld connection 11 is reduced thereby increasing impedance and, therefore, causing the circuit breaker to open at a smaller overcurrent than when a larger aperture 10 is used.

Thus, from the above it is seen that merely controlling the size of the aperture 10 controls the amount of overcurrent at which the circuit breaker will open to interrupt current flow. That is, selecting a different diameter for aperture 10 allows easy variation in the amount of current allowed through the weld connection 11 before it fails and current is automatically interrupted.

Further, the amount of overcurrent can be controlled by varying the thickness and resistivity of the materials chosen for the terminal assembly 2. That is, by increasing the thickness of the contact disk 8, the weld connection 11 is made thicker thereby reducing impedance such that an increased amount of current is allowed before failure of the weld connection 11, i.e., before the circuit breaker opens. Similarly, by decreasing the thickness of the contact disk 8, the weld connection 11 is made thinner thereby increasing impedance such that a decreased amount of current is allowed before failure of the weld connection 11. Further, by increasing the resistivity of the material used for the contact disk 8, impedance is again increased, thereby decreasing the current allowed before failure of weld connection 11. Similarly, by decreasing the resistivity of the material used for the contact disk 8, impedance is again decreased, thereby increasing the current allowed before failure of weld connection 11.

Although preferred embodiments have been described above, it is contemplated that numerous modifications may be made to the automatic circuit breaker of the present invention without departing from the spirit and scope of the invention as defined in the following claims.

I claim:

1. A battery having an automatic circuit breaker, comprising:
    a battery enclosure portion having an opening therein;
    an electric feed through extending through said opening;
    a terminal assembly having an aperture therein, said terminal assembly being mounted to the outside of said battery enclosure portion adjacent to said opening; and
    a first connection between said terminal assembly and said electric feed through, said first connection being made around the periphery of said aperture in said terminal assembly and forming a current path, wherein said aperture is sized so that upon development of a predetermined overcurrent, said first connection is broken.

2. A battery according to claim 1, further comprising an epoxy covering said first connection between said terminal assembly and said electric feed through thereby preventing arcing when said first connection is broken.

3. A battery according to claim 1, wherein said terminal assembly includes a contact disk having said aperture therein.

4. A battery according to claim 3, wherein said terminal assembly further includes a current plate having a hole therein, said battery further including a second connection between said current plate and said contact disk.

5. A battery according to claim 4, wherein said second connection has a higher current carrying capacity than said first connection.

6. A battery according to claim 4, wherein said hole in said current plate has a diameter which is larger than that of said aperture in said contact disk, and said hole in said current plate is concentric with said aperture in said contact disk.

7. A battery according to claim 6, wherein said second connection is concentric with said hole in said current plate.

8. A battery according to claim 4, wherein said current plate is made of copper and said contact disk is made of nickel.

9. A battery according to claim 4, wherein said terminal assembly further includes a stud connected to said current plate.

10. A battery according to claim 9, wherein said stud is threaded for connecting the battery to a load.

11. A battery according to claim 3, wherein said contact disk has a thickness selected in conjunction with the size of said aperture such that upon development of a predetermined overcurrent, said first connection between said terminal assembly and said electric feed through is broken.

12. A battery according to claim 3, wherein said electric feed through comprises a post connected to said contact disk.

13. A battery according to claim 12, wherein said first connection is formed between the portion of said contact disk around the periphery of said aperture and an end surface of said post.

14. A battery according to claim 13, further comprising an epoxy material covering said first connection.

15. A battery according to claim 12, wherein said contact disk is made of nickel and said post is made of molybdenum.

16. A battery according to claim 12, further comprising a current bussing structure within said battery enclosure portion, and a third connection between said post and said current bussing structure.

17. A battery according to claim 16, wherein said third connection has a higher current carrying capacity than said first connection.

18. A battery according to claim 16, further comprising an external insulator disposed between said battery enclosure portion and said terminal assembly, wherein said battery enclosure portion is disposed between said external insulator and said current bussing structure.

19. A battery according to claim 12, wherein said electric feed through further comprises an insulating spacer disposed within the opening in said battery enclosure portion, thereby insulating said post from said battery enclosure portion.

20. A battery according to claim 19, further comprising an external insulator disposed between said insulating and said contact disk.

21. A battery according to claim 3, wherein said electric feed through comprises a post, wherein said first connection is made between said post and said contact disk.

22. A battery according to claim 21, wherein said first connection is formed between a portion of said contact around the periphery of said aperture and an end surface of said post.

23. A battery according to claim 22, further comprising an epoxy material covering said first connection.

24. A battery according to claim 21, wherein said contact disk is made of nickel and said post is made of molybdenum.

25. A battery according to claim 21, wherein said electric feed through further comprises an insulating spacer disposed within the opening in said battery enclosure portion, thereby insulating said post from said battery enclosure portion.

26. A battery according to claim 1, further comprising an external insulator disposed between said battery enclosure portion and said terminal assembly.

27. A battery according to claim 1, wherein a diameter of said aperture, as well as a resistivity and thickness of said terminal assembly are selected so that the battery has a resistance less than or equal to 0.2 milliohms.

* * * * *